US006652279B2

(12) United States Patent
Santacruz

(10) Patent No.: US 6,652,279 B2
(45) Date of Patent: Nov. 25, 2003

(54) DENTAL DEVICE

(76) Inventor: Karen Santacruz, 4744 13th Ave. South, Minneapolis, MN (US) 55407

( * ) Notice: Subject to any disclaimer, the term of this patent is extended or adjusted under 35 U.S.C. 154(b) by 0 days.

(21) Appl. No.: 10/064,938

(22) Filed: Aug. 30, 2002

(65) Prior Publication Data

US 2003/0088934 A1 May 15, 2003

Related U.S. Application Data

(60) Provisional application No. 60/345,048, filed on Nov. 9, 2001.

(51) Int. Cl.$^7$ .................................................. A46B 9/04
(52) U.S. Cl. ........................ 433/216; 15/167.1; 15/106; 15/DIG. 5
(58) Field of Search ................................ 15/106, 167.1; 433/216; D4/109, 111, 105, 106, 112, DIG. 5

(56) References Cited

U.S. PATENT DOCUMENTS

| | | | |
|---|---|---|---|
| 289,550 A | * | 12/1883 | Miles, Jr. |
| 860,435 A | * | 7/1907 | Bangs |
| 2,190,277 A | * | 2/1940 | Viragh |
| 2,236,034 A | * | 3/1941 | Luce |
| 2,511,235 A | * | 6/1950 | Arwood |
| 4,911,187 A | * | 3/1990 | Castillo |
| D325,821 S | | 5/1992 | Schwartz |
| 5,315,731 A | * | 5/1994 | Millar |
| 5,459,898 A | * | 10/1995 | Bacolot |
| D365,209 S | * | 12/1995 | Plummer |
| 5,544,383 A | * | 8/1996 | Gamble |
| D383,307 S | | 9/1997 | Klein et al. |
| 5,930,860 A | | 8/1999 | Shipp |
| D424,303 S | | 5/2000 | Tobias |
| 6,065,176 A | | 5/2000 | Watanabe et al. |
| 6,070,286 A | * | 6/2000 | Cardarelli |
| 6,148,771 A | | 11/2000 | Costello |

FOREIGN PATENT DOCUMENTS

| | | | |
|---|---|---|---|
| FR | 1104529 | * | 6/1955 |
| GB | 2208470 | * | 4/1989 |

OTHER PUBLICATIONS

Printout of internet web cite www.fuzzytummy.com depiciting various pet toothbrushes (publication at least as early as Mar. 25, 2001).

* cited by examiner

*Primary Examiner*—Randall E. Chin
(74) *Attorney, Agent, or Firm*—Hovey Williams LLP

(57) ABSTRACT

A dental device (10) that provides effective teeth and gum cleaning when the device (10) is chewed, rotated, and/or brushed across the teeth is disclosed. The device (10) includes a body (12) presenting a multifaceted bristle-supporting surface (20) extending substantially around the circumference of at least a portion of the body (12). The device (10) further includes bristles (14) fixed relative to, and extending from, the facets (24,26) of the bristle-supporting surface (20). In the preferred embodiment, the body (12) includes a base (16) and a handle (18) extending from one end of the base (16). The base (16) supports the bristle-supporting surface (20) around its circumference and includes bristles (14) extending from the end opposite the handle (18). A dental device (100) embodying an alternative configuration is also disclosed. The device (100) includes a body (102) having a smooth bristle-supporting surface (106), and bristles (104) extending from the surface (106) to define relatively convergent and divergent axes.

20 Claims, 3 Drawing Sheets

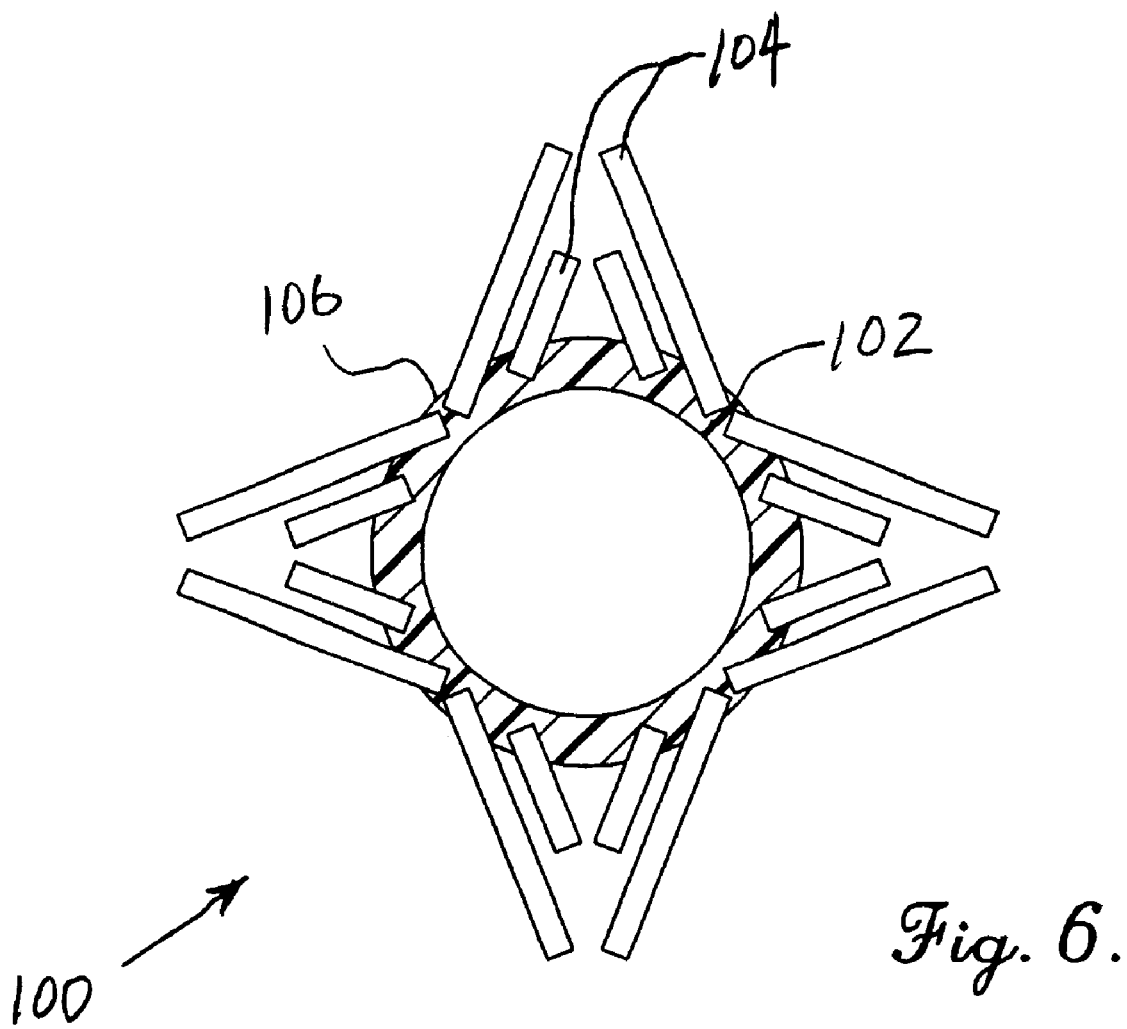

DENTAL DEVICE

CROSS REFERENCE TO RELATED APPLICATIONS

This application claims the priority of application Ser. No. 60/345,048, filed Nov. 9, 2001, entitled DENTAL DEVICE, which is hereby incorporated by reference herein.

BACKGROUND OF INVENTION

1. Field of the Invention

The present invention relates generally to dental devices used to clean teeth and gums. More specifically, the present invention concerns a dental device presenting bristles extending from a circumferential surface that provides effective teeth and gum cleaning when the device is chewed and/or brushed across the teeth.

2. Discussion of Prior Art

It is desirable to regularly clean teeth and gums in order to facilitate the prevention of tooth decay, gingivitis, and periodontal disease. There are devices known in the art for cleaning teeth and gums, such as toothbrushes and high speed polishing equipment. In some situations, however, use of these prior art instruments for effective dental hygiene is inhibited by the nature of the dentigerous user. For example, pets and some people (e.g., young children, impaired individuals, etc.) who cannot wield the instrument themselves, bite down on and/or chew on the instrument when a second party attempts to clean the user's teeth and gums. This biting down and/or chewing on the instrument frustrates the cleaning process, can damage the instrument, and may deter regular cleaning in the future. Furthermore, prior art toothbrushes typically require a conventional up-and-down stroke along the surface of the teeth to optimize the cleaning effect. This conventional stroke is difficult to achieve in an uncooperative dentigerous user.

Prior art products have been developed to facilitate maintaining the dental hygiene of pets. For example, known prior art products include toothbrushes—modeled after those for self-use by humans—, consumable chew products, and non-consumable "chews"—toys that use the act of chewing to enhance dental hygiene. These prior art products are problematic and have several limitations. For example, a toothbrush cannot effectively clean a pet's teeth when the pet is chewing on the brush. Moreover, toothbrushes do not encourage playful behavior between the second party brusher and the pet. The chews (consumable and non-consumable) do not effectively clean all of the surfaces of the teeth, do not provide gingival stimulation, and do not efficiently provide subgingival particle release.

SUMMARY OF INVENTION

The present invention provides an improved dental device that does not suffer from the problems and limitations of prior art devices as set forth above. The inventive device provides bristles extending from a circumferential surface that provides effective teeth and gum cleaning when the device is chewed and/or brushed across the teeth.

A first aspect of the inventive dental device of the present invention broadly includes a body presenting a multifaceted bristle-supporting surface extending substantially around the circumference of at least a portion of the body. The inventive device also broadly includes bristles fixed relative to, and extending from, the facets of the bristle-supporting surface.

A second aspect of the inventive dental device of the present invention broadly includes a base defining first and second opposite ends along a longitudinal axis, a handle extending from the first end, and bristles fixed relative to, and extending from, the second end. The handle and the bristles extend in generally opposite directions.

A third aspect of the present invention concerns a method of cleaning teeth and gums. The method broadly includes the steps of inserting a brush that has a generally cylindrical arrangement of bristles into the mouth of another and moving the brush while the other chews on it.

A fourth aspect of the inventive dental device of the present invention broadly includes a body presenting a circumferential surface and flexible bristles fixed relative to, and extending from, the surface. The body defines a generally curvilinear cross-sectional shape. The bristles include a first bristle extending along a first line of extension and a second bristle extending along a second line of extension. The first and second lines of extension converge as they extend away from the surface.

A fifth aspect of the inventive dental device of the present invention broadly includes a body presenting a circumferential surface and flexible bristles fixed relative to, and extending from, the surface. The body defines a generally circular cross-sectional shape.

Other aspects and advantages of the present invention will be apparent from the following detailed description of the preferred embodiment and the accompanying drawing figures.

BRIEF DESCRIPTION OF DRAWINGS

Preferred embodiments of the invention are described in detail below with reference to the attached drawing figures, wherein:

FIG. 6 is a cross-sectional view of a dental device constructed in accordance with an alternative embodiment of the present invention.

DETAILED DESCRIPTION

Figure 1:
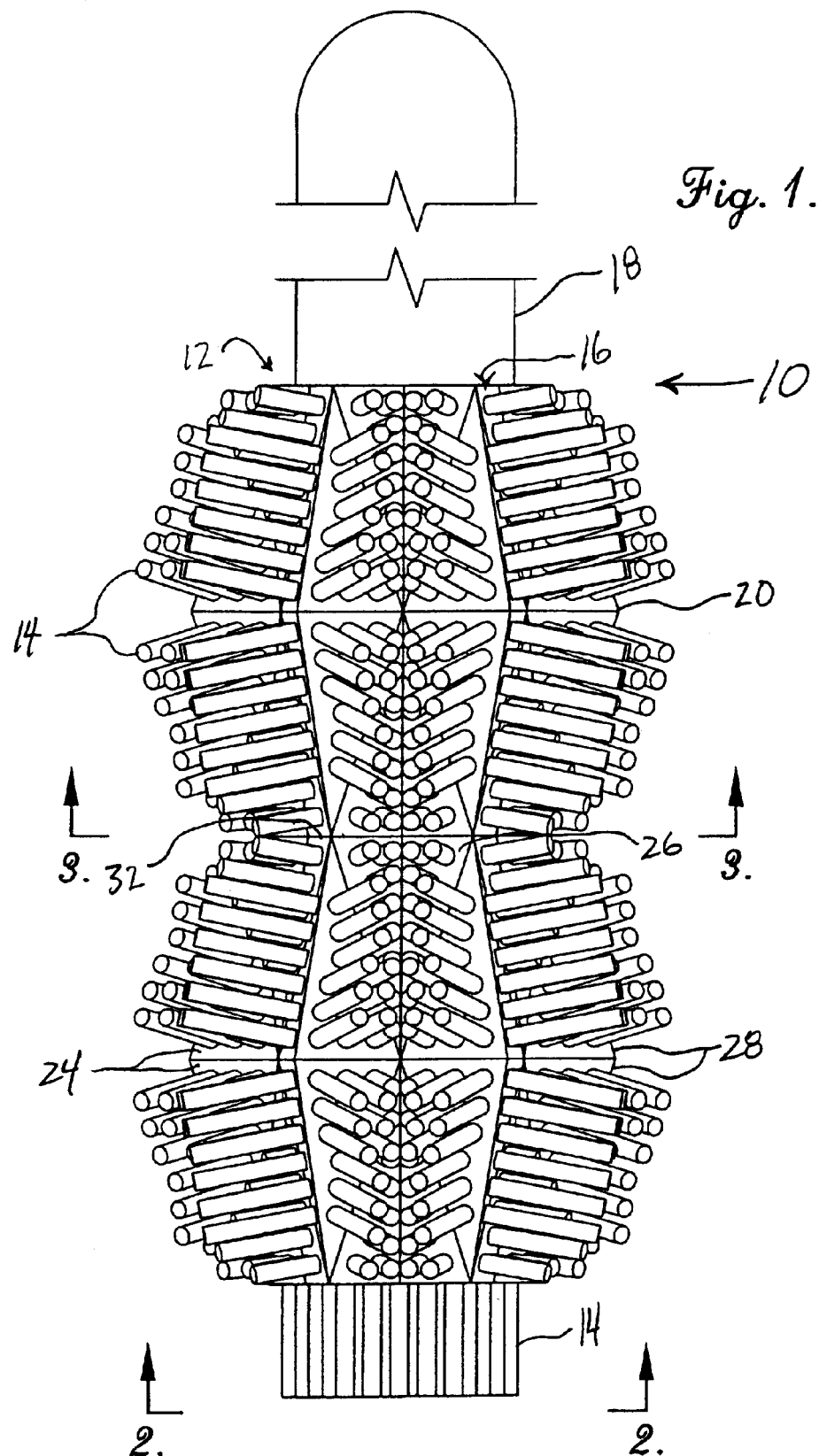
FIG. 1 is a plan view of a dental device constructed in accordance with a preferred embodiment of the present invention with the handle illustrated in a fragmentary view.

Turning initially to FIG. 1, the dental device 10 broadly includes a body 12 and bristles 14 fixed relative to, and extending from, the body 12. The body 12 of the illustrated dental device 10 includes a base 16 and a handle 18 extending from one end of the base 16. The illustrated device 10 is particularly adapted to be wielded by a second party brusher to effectively clean the teeth and gums of a dentigerous user that cannot wield the device themselves (e.g., a pet, a young child, an impaired individual, etc.). These types of dentigerous users present challenges to effective dental hygiene such as moving, biting, and chewing the device during teeth and gum cleaning. As will be subsequently described in detail, the dental device 10 provides an inventive bristle-supporting surface and complementing bristle arrangement that facilitates effective teeth and gum cleaning when the device 10 is chewed, rotated, and/or brushed across the teeth.

Figure 2:
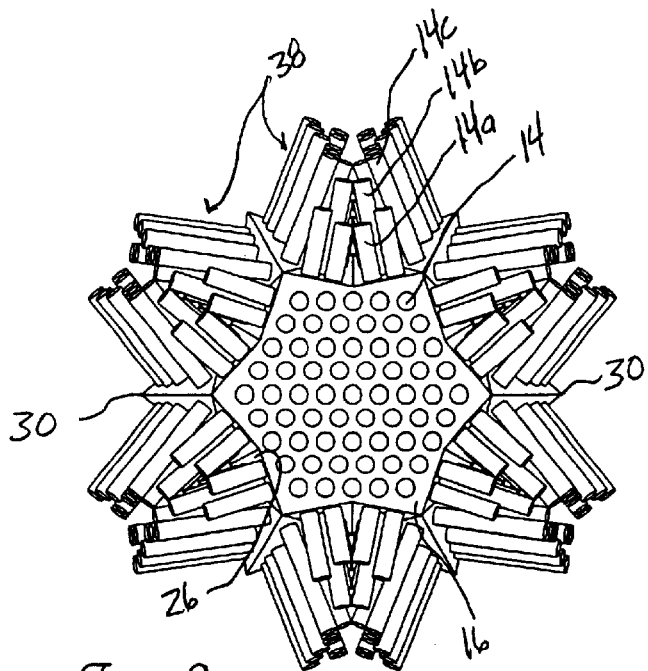
FIG. 2 is an elevational view of the dental device taken substantially along line 2—2 of FIG. 1.
Figure 3:
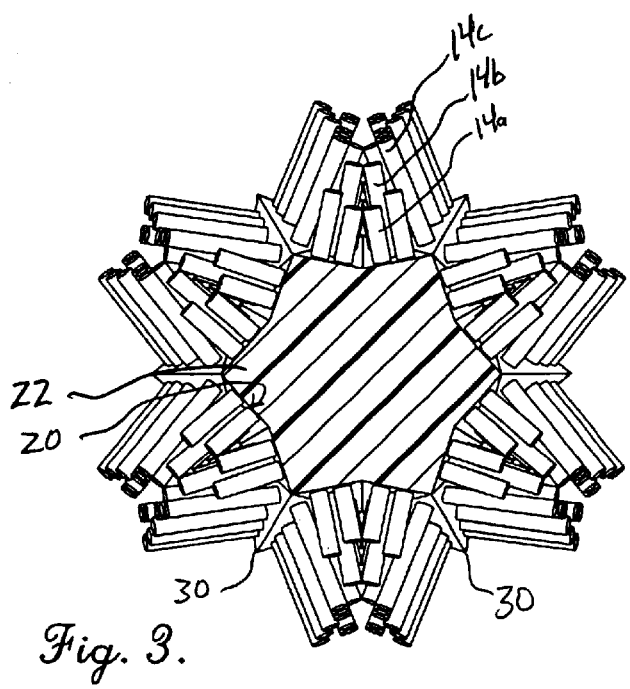
FIG. 3 is a cross-sectional view of the dental device taken substantially along line 3—3 of FIG. 1.

Turning to FIGS. 2 and 3, the base 16 presents a multi-faceted bristle-supporting surface 20 that circumferentially extends around a core 22 of the base 16. In the illustrated device 10, the surface 20 extends around the entire circumference of the base 16. However, as will subsequently be described, the surface 20 need not extend around the entire circumference, so long as it extends around a substantial portion thereof. The multiple facets of the bristle-supporting surface 20 include ridge facets 24 (see FIG. 4) and valley facets 26 (see FIG. 5).

Figure 4:
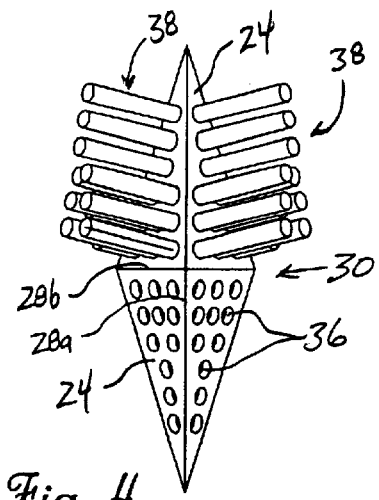
FIG. 4 is a fragmentary view of the bristle-supporting surface of the dental device illustrated in FIG. 1, showing a pyramid formed by four adjoining ridge facets and having the bristles removed from two of the facets.

The ridge facets 24 project outwardly relative to the core 22. The ridge facets 24 cooperate with a laterally adjacent ridge facet 24 to define an outwardly projecting ridge 28 therebetween. As shown in FIG. 4, each ridge facet 24 cooperates with three other ridge facets 24 to define a convex pyramid 30 projecting radially outward relative to the longitudinal axis of the base 16. The ridge facets 24 are dimensioned so that the ridges 28 extending along each convex pyramid 30 include longitudinally extending ridges 28a that are longer than laterally extending ridges 28b. In this manner, the convex pyramids 30 defined by the cooperating ridge facets 24 are generally diamond shaped. The convex pyramids 30 are positioned along the surface 20 so that the longitudinally extending ridges 28a also extend longitudinally along the base 16 (see FIG. 1).

Figure 5:
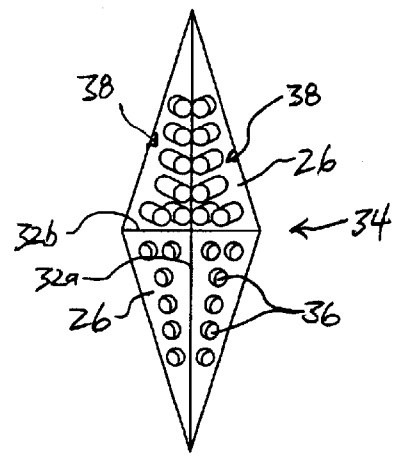
FIG. 5 is a fragmentary view of the bristle-supporting surface of the dental device illustrated in FIG. 1, showing a diamond shaped recess formed by four adjoining valley facets and having the bristles removed from two of the facets.

The valley facets 26 recess inwardly relative to the core 22. The valley facets 26 cooperate with at least one laterally adjacent valley facet 26 to define a recessed valley 32 therebetween. As shown in FIG. 5, when a valley facet 26 cooperates with three other adjacent valley facets 26, they define a concave pyramid 34 recessed into the surface 20 of the base 16. The valley facets 26 are dimensioned in a manner similar to the ridge facets 24 so that the valleys 32 defined by the cooperation of four valley facets 26 include longitudinally extending valleys 32a that are longer than laterally extending valleys 32b. In this manner, the concave pyramids 34 defined by four cooperating valley facets 26 have a diamond shape that complements the diamond shape of the convex pyramids 30 formed by the cooperating ridge facets 24.

As shown in FIGS. 1–3, in the illustrated dental device 10, the convex pyramids 30 are arranged in two circumferential rows of six pyramids 30 each. In each row, the six convex pyramids 30 are laterally aligned. Each laterally aligned convex pyramid 30 is separated from the successive laterally aligned pyramid 30 by two pairs of complementing, adjacent valley ridges 26. In this manner, as shown in FIGS. 2 and 3, each row has a cross section that is generally star shaped. In order to complement the laterally aligned convex pyramids 30, each pair of adjacent valley ridges 26 is oriented point-to-point with a corresponding pair of adjacent valley ridges 26. The two circumferential rows of laterally aligned convex pyramids 30 are longitudinally aligned so that each convex pyramid 30 is oriented point-to-point with a corresponding convex pyramid 30 from the longitudinally adjacent row. In this manner, the paired valley ridges 26 of one row cooperate with the longitudinally adjacent corresponding paired valley ridges 26 of the other row to form the concave pyramids 34.

Representative dimensions for the base include an average core diameter of between 1–2 cm. However, for dentigerous users having larger oral cavities, the base will have to be appropriately dimensioned. It is within the ambit of the present invention to utilize various designs and constructions for the bristle-supporting surface 20. For example, the arrangement of convex and concave pyramids could be reversed so that two rows of concave pyramids are formed wherein the two rows cooperate to form the convex pyramids. Additionally, the body could include multiple bases presenting tandem bristle-supporting surfaces (e.g., each base configured to clean either inside or outside tooth surfaces respectively). However, for purposes that will subsequently be described, it is important that the surface 20 include multiple facets, although the facets need not be any specific shape or even uniformly configured and arranged. For example, the facets could be curvilinear—rather than the illustrated flat configuration—and thereby cooperate to define rounded undulations. It is preferred that the surface 20 include outwardly projecting ridges in some form. It is believed that these ridges encourage the dentigerous user to bite and/or chew the dental device 10. As will subsequently be described, biting and/or chewing of the device 10 is desired.

As shown in FIGS. 4 and 5, each of the ridge and valley facets 24,26 include bristle-receiving apertures 36. The apertures 36 are each configured to receive one of the bristles 14. The illustrated bristles 14 are fixed to the facets 24,26 at the apertures 36. As will be described, the illustrated bristles 14 vary in length. However, it is within the ambit of the present invention to utilize bristles having a uniform length and varying the distance they extend from the surface 20 by recessing them into the core of the base at varying lengths. It is important, however, that the bristles be sufficiently fixed relative to the surface 20 so that they can withstand biting and/or chewing by the dentigerous user without displacing from the base 16.

In the illustrated dental device 10, each of the apertures 36 is associated with a tuft of bristles (illustrated schematically so that each tuft is designated by reference number 14) formed of a suitable natural fiber. However, it is within the ambit of the present invention to utilize alternative bristle configurations, such as a single bristle (e.g., formed of a durable synthetic resin-type material) associated with each aperture. It is important that the bristles are formed of a material that is sufficiently chewable, flexible, and soft to enable the bristles to be chewed by the dentigerous user without harming the user's gums, yet still provide the desired cleaning. In this regard, it is important that the bristles are formed of a material that is sufficiently resilient to enable the bristles to generally retain their original shape and configuration after brushing or being chewed by the dentigerous user. For example, in addition to natural fibers, the bristles could be formed of conventional plastics, nylon polymers, or preferably advanced materials such as poly buthyl teleputalate.

All of the facets 24,26 include a plurality of apertures 36 that cooperate with the associated bristles 14 to define a set of bristles 38 associated with each individual facet (see FIGS. 4 and 5). In the illustrated device 10, the bristles 14 in each bristle set 38 are generally parallel to one another. The bristles 14 preferably form an angle with the surface 20 that is less than or equal to 90 degrees and most preferably are perpendicular to the surface 20. In this manner, each bristle set 38 generally defines an axis 38' extending out of the surface 20 around which the bristles 14 of the particular set 38 are arranged. It is within the ambit of the present invention to utilize alternative bristle set designs, such as bristles within each set that are not generally parallel with each other.

The bristle sets 38 cooperate with the facets 24,26 so that the axes 38' defined by each bristle set 38/facet 24 or 26 combination forms oblique angles with the axes 38' defined by all adjacent bristle sets 38/facet 24,26 combinations. The axes 38' defined by the bristle sets 38 associated with the valley facets 26 are convergent (as the bristles 14 extend away from the surface 20) with the axis 38' defined by the bristle set 38 associated with an immediately adjacent ridge facet 24. Similarly, the axes 38' defined by each valley facet 26 is convergent with the axes 38' defined by any adjacent valley facet 26. The axes 38' defined by each ridge facet 24 is divergent (as the bristles 14 extend away from the surface 20) with the axes 38' defined by any laterally adjacent ridge facet 24. In this manner, the longitudinally extending ridges 28a extend between bristle sets 38 defining divergent axes 38'.

When a dentigerous user bites down or chews on one or more bristle sets 38, the dental device 10 can be rotated or manipulated by the second party brusher so that the chewed on bristles 14 clean top and bottom tooth surfaces. The bristle sets 38 adjacent to the chewed on bristles 14 clean outer and inner teeth surfaces and gum lines. Accordingly, it is important that the bristle-supporting surface and the associated bristles extend substantially around the circumference of the base to provide cleaning of substantially all tooth surfaces.

To facilitate the cleaning of teeth and gums having diverse surface elevations relative to the device 10 in use, the bristles 14 extend from the surface 20 at varying lengths. In particular, the illustrated device 10 includes short bristles 14a, long bristles 14b, and medium bristles 14c. The long bristles 14b extend from the surface 20 a distance greater than the short bristles 14a extend. The medium bristles 14c extend from the surface 20 a distance greater than the short bristles 14a extend but less than the long bristles 14b extend. In the illustrated device 10, at least a portion of the bristles 14 that comprise the bristle sets 38 that are associated with the valley facets 26 are short bristles 14a and at least a portion are medium bristles 14c. The ridge facets 24 include bristle sets 38 that have at least a portion of the bristles 14 including long bristles 14b. When the dentigerous user chews on the device 10, the short bristles 14a clean top and bottom tooth surfaces (e.g., surfaces of molar teeth). The long and medium bristles 14b, 14c clean outer and inner tooth surfaces and gum lines. Representative bristle dimensions include a long bristle length (i.e., the distance the long bristles extend from the surface) of about 1 cm., although the length should vary according to the size of the intended dentigerous user's teeth. Although bristles that extend from the surface at varying distances are preferred, it is within the ambit of the present invention to utilize alternative bristle configurations, such as uniform bristle lengths that all extend from the surface the same distance.

In the illustrated dental device 10, the base 16 defines opposing ends along a generally longitudinal axis. The handle 18 extends from one of the ends. As shown in FIGS. 1 and 2, extending from the end opposite the handle 18 are bristles 14. These end bristles facilitate cleaning teeth and gums located towards the back of the dentigerous user's mouth. In the illustrated device 10, the surface of the bristled end is relatively flat, however, it is within the ambit of the present invention to utilize alternatively designed ends. For example, the end surface could be convex or concave and could include ridges and/or valleys. The bristles extending from the end surface could extend therefrom at various lengths.

The handle 18 is generally cylindrical shaped and is dimensioned to provide a sufficient grip to allow the second party brusher to firmly hold the device 10 so that it can be at least partially rotated while the dentigerous user is biting and/or chewing on the base 16. The handle 18 additionally allows some spacing between the brusher and the dentigerous user. Although the body of the dental device of the present invention preferably includes a handle, it is within the ambit of the present invention to utilize alternative designed bodies that do not implement a handle. For example, the base could be sufficiently dimensioned to allow a second party brusher to grip a portion of it while the dentigerous user bites and/or chews a separate portion, or the device could simply be chewed by the dentigerous user without manipulation by a second party brusher.

The core 22 is preferably formed of a compressible material (e.g., rubber, covered foam, etc.) that retains its original shape. It is important that the core be formed of a material that is sufficiently compressible to enable the body to be chewed by a dentigerous user without damaging the user's gums, yet retain the body's original shape to provide the desired cleaning. The core is preferably hollow and operable to receive dental additives including toothpaste and/or flavoring (not shown). For example, the additives could be injected into the core material through the bristle-receiving apertures during assembly of the device, or the handle could be removable to allow material or inserts to be introduced into the core after manufacture. The core could alternatively be impregnated with the additives or in some other manner contain additives that could pass from an internal chamber of the core through the bristle-receiving apertures, or other openings provided in the body (not shown), etc. The dental additives preferably encourage the dentigerous user to bite and/or chew the base.

Operation

In operation, the dental device 10 is wielded by a second party brusher to clean the teeth and gums of a dentigerous user. The brusher grips the device 10 by the handle 18 and inserts it into the mouth of the user. If the user is not biting and/or chewing on the device 10, the brusher brushes it across the surfaces of the user's teeth and gums. If, however, the dentigerous user bites and/or chews on the device 10, the second party brusher rotates and/or manipulates the device 10 so that the chewed on bristles 14 clean top and bottom surfaces of the teeth. The short bristles 14a clean the inner surfaces of the teeth. The bristle sets 38 adjacent to the set or sets 38 that are clamped between the user's clinched teeth clean the surrounding inner and outer teeth surfaces and gum lines. In this manner, the dental device 10 is particularly suited to clean the teeth and gums of a pet. The brusher's manipulation of the device 10 while the user is biting and/or chewing on it encourages playful banter between the two.

As previously indicated, the body and the bristles of the inventive dental device could both utilize various alternative configurations and designs. The body could define alternative cross-sectional shapes that vary from the star shape illustrated in FIGS. 2 and 3. For example, the cross-sectional shape could be virtually any shape (e.g., polygonal, curvilinear, etc.). The associated circumferential bristle-supporting surface could be variously undulated (e.g., flat as illustrated in FIGS. 1–5, rounded, etc.) or could be smooth. If a smooth surface is utilized, the bristles preferably define at least some relative convergent or divergent axes. One such alternative embodiment is the dental device 100 illustrated in FIG. 6. The dental device 100 broadly includes a body 102 and bristles 104, fixed relative to, and extending from the body 102.

The body 102 is similar to the previously described body 12, however, the body 102 defines a round cross-sectional shape and has a smooth bristle-supporting surface 106. The bristles 104 are similar to the previously described bristles 14, however, the bristles 104 extend from the surface 106 at varying angles. In this manner, the bristles 104 define axes that are either convergent or divergent with the axis defined by at least one adjacent bristle.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states her intent to rely on the Doctrine of Equivalents to determine and assess the reasonably fair scope of the present invention as pertains to any apparatus not materially departing from but outside the literal scope of the invention as set forth in the following claims.

What is claimed is:

1. A dental device comprising:
    a body presenting a multifaceted bristle-supporting surface extending substantially around the circumference of at least a portion of the body; and
   bristles fixed relative to, and extending from, the facets of the bristle-supporting surface, the facets of the bristle-supporting surface including ridge facets and valley facets, said ridge facets cooperating to define outwardly projecting ridges, said valley facets cooperating to define recessed valleys.

2. The dental device as claimed in claim 1,
    each of the facets cooperating with a plurality of said bristles to define a set of bristles associated with each facet,
    each of said bristle sets defining an axis.

3. The dental device as claimed in claim 2,
    each of the facets cooperating with at least one adjacent facet so that the axes of the bristle sets extending from the adjacent facets define an oblique angle.

4. The dental device as claimed in claim 3,
    each of said ridge facets cooperating with at least three other ridge facets to define a pyramid in the surface of the body.

5. The dental device as claimed in claim 4,
    at least one of said ridges extending longitudinally along each of said pyramids.

6. The dental device as claimed in claim 5,
    said at least one longitudinally extending ridge extending between sets of bristles having divergent axes.

7. The dental device as claimed in claim 6,
    each of said pyramids being adjacent at least two valley facets.

8. The dental device as claimed in claim 7,
    the bristle sets extending from said at least two valley facets including at least a portion of bristles that extend from the surface of the corresponding facet to define a first length,
    the bristle sets extending from the ridge facets of said adjacent pyramid including at least a portion of bristles that extend from the surface of the corresponding facet to define a second length wherein the second length is greater than the first length.

9. The dental device as claimed in claim 2,
    at least one of the bristle sets including bristles that extend from the surface of the corresponding facet at varying distances.

10. The dental device as claimed in claim 1,
    the body including a base and a handle extending from the base,
    said base comprising said at least a portion of the body.

11. The dental device as claimed in claim 10,
    said handle being generally cylindrical in shape.

12. The dental device as claimed in claim 10,
    said base including a portion thereof being operable to receive dental additives wherein said additives are selected from the group consisting of toothpaste and flavorings.

13. The dental device as claimed in claim 10,
    said base defining first and second opposite ends along a longitudinal axis,
    said handle extending from the first end; and
    end bristles fixed relative to, and extending from, the second end,
    said handle and end bristles extending in generally opposite directions.

14. The dental device as claimed in claim 13,
    said base including a compressible core.

15. A method of cleaning teeth and gums comprising the steps of:
    (a) providing a brush that has a generally cylindrical arrangement of bristles projecting from a multifaceted bristle-supporting surface, wherein the surface includes ridge facets cooperating to define outwardly projecting ridges and valley facets cooperating to define recessed valleys;
    (b) inserting the brush into the mouth of another; and
    (c) moving the brush while the other chews on it.

16. A dental device comprising:
    a body presenting a circumferential surface,
    said body defining a generally curvilinear cross-sectional shape; and
    flexible bristles fixed relative to, and extending from, the surface,
    said bristles including a first bristle extending along a first line of extension and a second bristle extending along a second line of extension,
    said first and second lines of extension converging as they extend away from the surface, said surface including a plurality of undulations therein.

17. The dental device as claimed in claim 16,
    said cross-sectional shape being generally star shaped.

18. The dental device as claimed in claim 17,
    said undulations including generally symmetrical concavities interposed between generally symmetrical convexities.

19. The dental device as claimed in claim 16,
    said bristles including a third bristle extending along a third line of extension,
    said first and third lines of extension diverging as they extend away from the surface.

20. The dental device as claimed in claim 16,
    said flexible bristles being arranged into a plurality of spaced apart tufts each including a multiplicity of the bristles.

* * * * *